(12) United States Patent
Clark et al.

(10) Patent No.: US 7,282,193 B2
(45) Date of Patent: Oct. 16, 2007

(54) METHOD FOR ENERGY RECOVERY FROM HYDROGEN SULFIDE

(75) Inventors: Peter D. Clark, Calgary (CA); David K. Stevens, Stilwell, KS (US)

(73) Assignee: Black & Veatch Corporation, Overland Park, KS (US)

( * ) Notice: Subject to any disclaimer, the term of this patent is extended or adjusted under 35 U.S.C. 154(b) by 264 days.

(21) Appl. No.: 11/157,196

(22) Filed: Jun. 20, 2005

(65) Prior Publication Data
US 2007/0025900 A1   Feb. 1, 2007

(51) Int. Cl.
*C01B 17/04* (2006.01)
(52) U.S. Cl. .............................. 423/573.1; 423/574.1; 423/576.2; 423/576.8; 423/543
(58) Field of Classification Search ............ 423/573.1, 423/574.1, 576.2, 576.8, 543
See application file for complete search history.

(56) References Cited

U.S. PATENT DOCUMENTS

| 4,632,819 A | * | 12/1986 | Fischer et al. | ........... 423/574.1 |
| 4,849,203 A | * | 7/1989 | Palm | ........................ 423/574.1 |
| 5,304,361 A | * | 4/1994 | Parisi | ......................... 423/220 |
| 5,486,345 A | * | 1/1996 | Watson | ..................... 423/573.1 |
| 6,495,117 B1 | * | 12/2002 | Lynn | ........................ 423/573.1 |

* cited by examiner

*Primary Examiner*—Timothy C. Vanoy
(74) *Attorney, Agent, or Firm*—F. Lindsey Scott

(57) ABSTRACT

A method for producing sulfur and energy from an acid gas stream containing hydrogen sulfide by partially combusting the acid gas stream to produce a combustion product gas, mixing a sulfur dioxide stream with the combustion product gas, separating sulfur from the mixture, combusting sulfur to produce sulfur dioxide and heat energy and passing at least a portion of the sulfur dioxide to the combustion product gas.

17 Claims, 2 Drawing Sheets

METHOD FOR ENERGY RECOVERY FROM HYDROGEN SULFIDE

FIELD OF THE INVENTION

This invention relates to the production of sulfur and energy from a stream comprising hydrogen.

BACKGROUND OF THE INVENTION

Processes for the treatment of acid gas streams containing hydrogen sulfide to produce sulfur are well known, with the best-known process possibly being the Claus process. In the Claus process, the acid gas stream is partially oxidized by the use of an oxygen-containing stream, such as oxygen, air or oxygen-enriched air, at a temperature sufficiently high to combust a portion of the hydrogen sulfide ($H_2S$) to sulfur dioxide ($SO_2$) and to combust any hydrocarbons or other combustible compounds in the acid gas stream. Typically the combustion flame temperature is maintained in a range of about 1500 to about 2000° F. The combustion is regulated to produce a product gas stream, which desirably has a hydrogen sulfide to sulfur dioxide ratio of about 2:1. This ratio is the stoichiometric relationship between hydrogen sulfide and sulfur dioxide when they are reacted to produce sulfur and water.

The Claus process reactions can be considered to be:

By review of these reactions, it will be observed that hydrogen sulfide can be combusted readily to produce sulfur dioxide. When the ratio of the hydrogen sulfide and sulfur dioxide is adjusted to the proper range, the reaction shown in equation (2) can be used to produce sulfur. While it is difficult to achieve complete reaction in any such system, the Claus process is very effective since it uses catalytic steps downstream from the combustion zone to convert the reactant gases to sulfur.

In many instances there will be some carbon dioxide in the acid gas stream initially and the total composition of the acid gas stream must be taken into account when the amount of oxygen to be charged to the combustion zone is determined.

The reaction gases are typically cooled to a temperature generally in the range of about 500 to about 600° F. or cooler to separate sulfur from the gaseous mixture produced in the combustion zone. The sulfur is recovered as a liquid and the reaction product gases are passed to Claus process catalytic reaction units. One or more Claus unit catalytic chambers may be used with subsequent cooling of the reaction gases and sulfur condensation after each unit. Such processes are very well known to those skilled in the art and need not be discussed in detail.

The energy recovered from such processes is primarily that produced as a result of the oxidation in the combustion zone, plus the heat produced in the catalytic reaction zones of the Claus unit. This heat recovery is offset to a certain extent by the necessity to heat the reaction mixtures after each sulfur separation step to a suitable temperature for charging to the next catalytic Claus reaction zone. Accordingly, only limited amounts of energy are produced for export to other processes by the conversion of the acid gas stream.

It is further well known that tail gases discharged from the Claus reaction may contain minor quantities of hydrogen sulfide, sulfur dioxide, as well as other light gases in some instances. Such gases are desirably processed before discharge to the atmosphere, as well known to those skilled in the art.

Since this process involves relatively high temperature equipment, it would be advantageous if the process were used to produce additional energy as well as conversion of the hydrogen sulfide gas in the acid gas stream.

SUMMARY OF THE INVENTION

The present invention comprises a method for producing energy from an acid gas stream comprising hydrogen sulfide, the process comprising: charging the acid gas stream comprising hydrogen sulfide and an oxygen-containing gas to a combustion zone; combusting a quantity of the acid gas sufficient to produce a combustion flame temperature from about 1500 to about 2000° F. and a combustion product gas comprising hydrogen sulfide and sulfur dioxide; mixing a sulfur dioxide stream with the combustion product gas product in an amount sufficient to produce a reaction gas having an $H_2S:SO_2$ ratio from about 1.9 to about 2.1; cooling the reaction gas to produce sulfur and heat energy; passing the cooled reaction gas to a Claus process to produce sulfur; combusting sulfur with an oxygen-containing gas in at least one combustion chamber to produce a combustion product sulfur dioxide stream and heat energy; and, passing at least a portion of the combustion product sulfur dioxide stream to mixture with the combustion product gas.

DETAILED DESCRIPTION OF THE INVENTION

In the discussion of the Figures, numerous valves, heat exchangers, and the like required to achieve the process flows shown have not been shown in the interest of simplicity since such equipment is well known to those skilled in the art.

Figure 1:
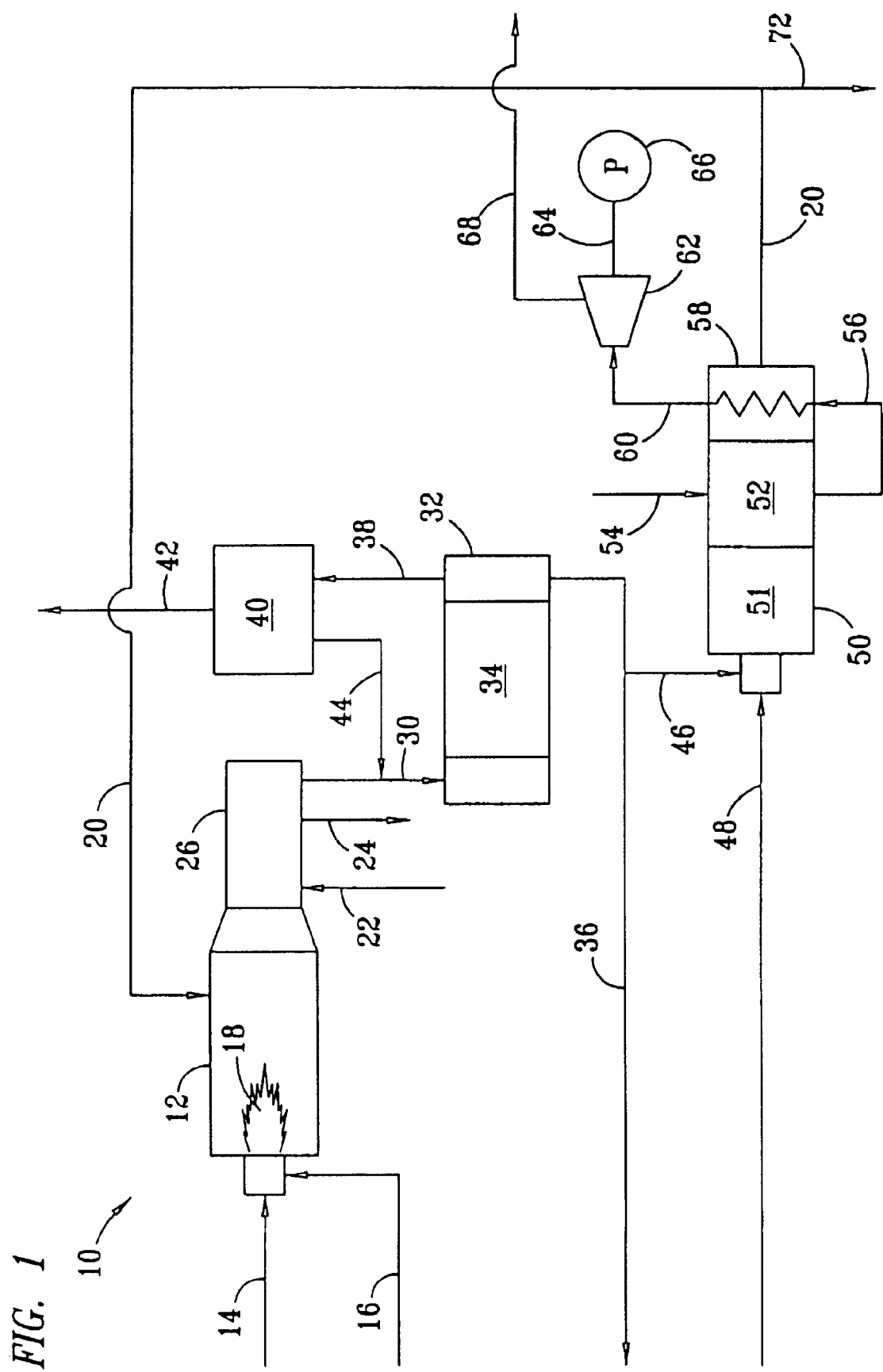
FIG. 1 is a schematic diagram of an embodiment of the present invention.

In FIG. 1, an embodiment 10 of the present invention is shown. A thermal reactor 12, such as commonly used in Claus processes, is shown. An acid gas feedstream is charged to thermal reactor 12 via a line 14 and an oxygen-containing gas stream is charged to thermal reactor 12 via a line 16. The oxygen-containing gas may be oxygen, air or oxygen-enriched air. A flame 18 is maintained in thermal reactor 12 wherein a sufficient quantity of hydrogen sulfide is burned to maintain a reactor flame temperature of about 1500 to about 2000° F. This temperature is generally considered necessary to ensure that combustion of all combustible materials in the acid gas feedstream is completed. Desirably, the amount of oxygen charged is sufficient to maintain this temperature. In a conventional Claus process, the amount of oxygen charged is also sufficient to result in the combustion of a sufficient amount of the hydrogen sulfide to result in a hydrogen sulfide to sulfur dioxide ratio of about 2:1 in the combustion product gas.

According to the present invention, only that amount of hydrogen sulfide necessary to achieve the desired flame temperature is combusted. Additional sulfur dioxide is added through line 20 to produce the desired ratio of $H_2S:SO_2$ in the gaseous mixture comprising the added sulfur dioxide and the combustion products. The gaseous mixture is then passed to a waste heat boiler 26 wherein a boiler feed water stream 22 is charged as a coolant, which is converted into steam and then recovered through a line 24. Desirably the gas stream is cooled in water waste heat boiler 26 to a temperature from about 400 to about 600° F. The gas stream is then passed via a line 30 to a heat exchanger 34 and to a sulfur condenser zone 32 from which sulfur is recovered at a temperature from about 250 to about 450° F. via a line 36. This sulfur condenser includes heat exchanger 34, which may comprise a plurality of heat exchange bundles. Typically these are water cooled to produce steam.

A reaction product stream from one or a plurality of Claus catalytic reaction beds are used to complete the reaction of hydrogen sulfide and sulfur dioxide is passed to heat exchanger 34 via a line 44 and line 30. This heat exchange system has been shown schematically and it should be recognized by those skilled in the art that heat exchanger 34 is used to cool the reaction stream or with the sulfur dioxide mixture from thermal reactor 12 and waste heat boiler 26 to a temperature of about 250 to about 450° at which point sulfur can be recovered through line 36 and partially passed via line 36 to use as a product. The reaction gases recovered from the sulfur condensation are passed via a line 38 back to a subsequent Claus process 40, which may comprise a plurality of catalytic reaction vessels. As well known to those skilled in the art, such streams, after cooling, are typically reheated to a suitable temperature for treatment in further Claus catalytic vessels and the like. Further, a tail gas stream is typically produced in the Claus process, as shown by line 42.

A plurality of reaction gas streams would typically be recovered from sulfur condenser 32 and passed via separate lines 38 back to subsequent Claus catalytic process vessels with a plurality of catalytic process vessel effluent streams being recovered and passed via a line 44 to heat exchange in heat exchanger 34. Such aspects of the Claus process do not form a part of the present invention except as required in the overall process and have not been discussed in detail.

According to the present invention, sulfur supplied via a line 46 is burned in a sulfur combustor 50, which includes a combustion zone 51 and a heat recovery section 52. An oxygen-containing gas such as oxygen, air, oxygen-enriched air and the like is passed via a line 48 to combustion zone 51. Desirably the sulfur passed through line 46 is passed to sulfur combustor 50 as a liquid stream with the two streams being charged at a pressure such that the sulfur dioxide produced is readily recovered as a liquid stream by cooling rather than by compression and cooling. In heat recovery section 52, a water stream or low-pressure steam is supplied through a line 54 and recovered through a line 56 for passage to a steam superheater 58. The superheated steam is recovered through a line 60 and passed to a turboexpander 62, which is driven by the superheated steam. The superheated steam after expansion in the turboexpander may be passed to a line 68 for use as boiler feed water, discharge, reheating or the like. Turboexpander 62 drives an electric generator 66 or the like to produce power. Turboexpander 62 is shown connected to power generator 66 by a shaft 64, or the like. The sulfur dioxide so generated is passed via a line 20 back to use in thermal reactor 12, as discussed previously.

By the process of the present invention, additional thermal energy is produced by combustion of a portion of the sulfur to produce sulfur dioxide, which is then passed to thermal reactor 12. The heat produced by the combustion of the sulfur represents a substantial energy generation that is achieved as a part of the process for the conversion of hydrogen sulfide to sulfur. In other words, the sulfur is combusted to produce sulfur dioxide, which is used to limit the amount of hydrogen sulfide that must be combusted. The energy produced by the oxidation of the sulfur dioxide is a substantial amount of energy that is usable for process steam, generation of electrical power or the like. The sulfur combustion and recycle steps enable the combustion of an amount of sulfur that may approach one-half of the amount of hydrogen sulfide on a molecular basis to generate energy with the combustion product ($SO_2$) being recycled to the Claus process to produce additional sulfur that may be used for the hydrogen sulfide conversion step.

By review of equation (2) above, it will be clear that supplying the sulfur dioxide from an auxiliary source facilitates the conversion of hydrogen sulfide to sulfur. The amount of hydrogen sulfide that must be oxidized to sulfur dioxide in thermal reactor 12 has been greatly reduced by the recycle of the sulfur dioxide produced by the combustion of sulfur. While quantities of heat are recovered from the combustion product gas and from the discharge streams from the Claus process catalytic units, substantial quantities of this heat are required to reheat the reaction gases after separation of sulfur after each Claus catalytic unit. The net heat produced is not a substantial amount of heat.

By the process of the present invention, sulfur is combusted to produce sulfur dioxide in an amount generally equal to the requirements for reaction with the hydrogen sulfide, after taking into account the quantities of sulfur dioxide produced by combustion of hydrogen sulfide. This results in a lower combustion requirement for the acid gas stream since the acid gas stream normally would be required to be combusted to produce a mol ratio of hydrogen sulfide to sulfur dioxide of about 2:1.

By the process of the present invention, only sufficient hydrogen sulfide need be combusted to produce the desired flame temperature. This flame temperature may be sustainable, at least in part, by other organic constituents in the acid gas stream. In any event, the additional sulfur dioxide, which may be required as a result of the reduced combustion, is supplied by the recycle line from the sulfur combustion unit. The sulfur combustion unit generates substantial readily recovered heat. It will be clear upon review of the equations above that the sulfur dioxide produced in the sulfur combustion operation is readily reconverted to sulfur for subsequent combustion and recycle. Desirably the amount of sulfur combusted is at least that amount required to produce the required amounts of sulfur dioxide. Additional sulfur dioxide may be produced and stored for use either as a product as discussed below or for subsequent recycle. In either event, a substantial quantity of heat is produced. It will be immediately apparent that a substantial quantity of sulfur can be combusted, i.e., up to nearly one-half the stoichiometric equivalent of the amount of hydrogen sulfide charged with the acid gas stream. This provides a substantial additional source of energy for use in the process as steam, electrical power or the like. Accordingly, the Claus process has been modified by the present invention to produce greatly increased quantities of energy.

The ability to combust the sulfur into sulfur dioxide with the production of energy with the recycle of the sulfur dioxide to the thermal reactor results in the ability to recycle a stream that is beneficial to the Claus process while at the same time generating substantial additional energy.

Desirably the amount of sulfur combusted is an amount that is substantially equal to the amount required in thermal reactor 12. Additional sulfur dioxide can be produced if desired for other purposes or disposal via a line 70 or the like if heat requirements require the combustion of a larger quantity of sulfur.

Figure 2:
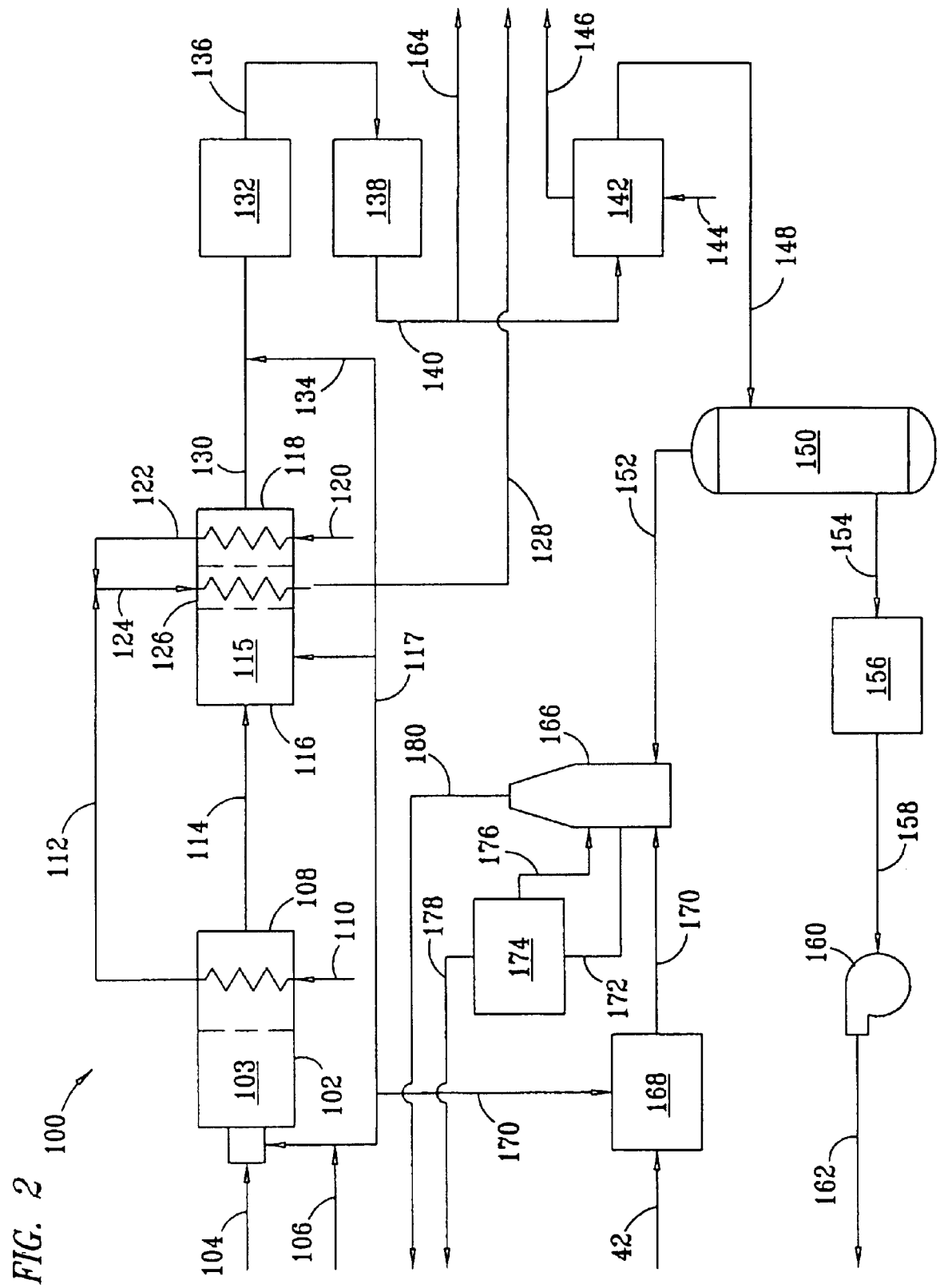
FIG. 2 is a schematic diagram of an embodiment of an alternate system for the combustion of sulfur according to the present invention.

In FIG. 2, an alternate process 100 is shown for the combustion of the sulfur. The process comprises a first sulfur combustor 102, which includes a combustion chamber 103. Molten sulfur is charged via a line 104 with oxygen being charged via a line 106 to combustion chamber 103. In combustion chamber 103, a quantity of sulfur is combusted to produce an elevated temperature consistent with the materials of construction of the vessel. Generally the quantity of oxygen is limited to control the temperature in first sulfur combustor 102. The gas used is desirably oxygen, air, or oxygen-enriched air. The greatest efficiency is accomplished using pure oxygen but economics may dictate that it is more advantageous to handle the added gaseous volume resulting from the use of air or oxygen-enriched air.

Thermal energy produced by the combustion of the sulfur is recovered in a heat recovery section 108 wherein a feed water line 110 passes water to the heat recovery section with steam being recovered through a line 112. The reaction products from the first sulfur combustor are passed via a line 114 to a second sulfur combustor 116 in series with the first sulfur combustor, which includes a combustion chamber 115. Oxygen is passed to chamber 115 via a line 117 with the reaction products from first combustor 102 being desirably combusted to substantially complete reaction to sulfur dioxide. Desirably slightly sub-stoichiometric amounts of oxygen-containing gas are used. While it is desirable to achieve complete reaction to sulfur dioxide, it is also desirable to minimize the amount of sulfur trioxide that may be formed. The resulting combustion product stream passes through a superheater section 126 to produce superheated steam, which is recovered through a line 128. Water is supplied through a line 120 to heat recovery section 118 to produce additional steam through a line 122. The combined streams from lines 122 and line 112 are then passed through superheater section 126. The reaction product is then passed via a line 130 to a sulfur dioxide oxidation reactor 132. In this reactor, remaining quantities of unreacted sulfur are reacted to produce sulfur dioxide. The sulfur dioxide stream is then recovered through a line 136 and passed to a sulfur trioxide/oxygen scavenger vessel 138. These vessels function as well known to those skilled in the art to convert substantially the entire stream to sulfur dioxide and subsequently remove any quantities of sulfur trioxide and oxygen from the combined gas stream.

Oxygen is supplied to oxidation reactor 132 via a line 134. This stream may also be oxygen, air or oxygen-enriched air. If the sulfur dioxide contains sufficiently minor quantities of contaminant materials it may be withdrawn in part through a line 164 and recycled back to the reaction zone of the Claus process. Such is not a preferred embodiment but is shown as an option via line 164.

The sulfur dioxide stream after treatment in vessel 138 is passed via a line 140 to a heat exchanger 142 where a water stream 144 is used for heat exchange and recovered as heated feed water or the like through a line 146. The cooled sulfur dioxide stream is then passed via a line 148 to a separation tower 150 where the sulfur dioxide is separated and recovered via a line 154 and light non-condensable gases, such as nitrogen, if air or oxygen-enriched air is used; unreacted materials and the like are recovered overhead via a line 152. These materials are passed to a tower 166 for treatment for discharge to the atmosphere. The recovered sulfur dioxide is passed via a line 154 to sulfur dioxide storage 156 from which it may be passed via a line 158 to a pump 160 for passage via a line 162 to thermal reactor 12, to storage, marketing or disposal.

Typically sulfur dioxide may be passed to thermal reactor 12 of FIG. 1 via a line 164 after treatment to remove sulfur trioxide and oxygen. A large number of variations are possible within the scope of the present invention, which basically requires that sulfur be oxidized to produce sulfur dioxide for recycle to the Claus thermal reactor with the resulting production of heat energy by combustion of the sulfur. As indicated previously, roughly half the molecular equivalent of the hydrogen sulfide remaining after combustion of the required portions of the acid gas stream can be supplied as sulfur dioxide with the resulting production of substantial heat energy.

In FIG. 2, the light condensable materials in line 152 are passed to a tower 166 for the treatment of gases to be discharged to the atmosphere. Similarly, gases from line 42 in FIG. 1, which represent tail gas from the Claus process are passed to an oxidizer 168 with the resulting oxidized gases being passed to tower 166 through line 170. In tower 166 a sulfur dioxide absorption section (not shown) is included and is connected to a sulfur dioxide removal system such as a CANSOLV® sulfur dioxide removal system 174. The sulfur dioxide is removed through a line 172, passed to the sulfur dioxide removal unit 174 with the gases from which the sulfur dioxide has been removed being returned to tower 166 via a line 176. The tower 166 removes various environmental pollutants from the exhaust gas stream prior to discharge to the atmosphere through a line 180. The sulfur dioxide recovered from the sulfur removal process through line 178 is passed to recycle to the thermal reactor in the Claus process. The sulfur dioxide for passage to thermal reactor 12 is preferably recovered through line 178 or line 164 for passage to the thermal reactor 12 in FIG. 1 or alternatively supplied from sulfur storage 156 via line 162 to thermal reactor 12.

As previously stated, the sulfur is desirably injected into the sulfur combustion chamber as a preheated liquid at a pressure sufficiently high to enable recovery of the resulting sulfur dioxide as a liquid by condensation without the need for gas compression.

Typically the desired pressure is from about atmospheric to about 1000 psi.

Desirably the oxygen-containing gas is supplied to the sulfur combustion chamber as a dry gas so that the formation of corrosive products is minimized. It is also desirable to use an oxygen-containing stream of as high an oxygen content as possible to minimize the volume of gases that must be handled.

When two sulfur oxidation reactors are used, it is desirable to control the amount of oxygen supplied to the first reactor to a level such that the combustion temperature does not exceed the temperature capabilities of the equipment. Desirably, after cooling, the reaction mixture is passed to the second sulfur oxidation zone where a slightly sub-stoichiometric amount of oxygen is used to minimize the formation of sulfur trioxide. Heat values are recovered from both the first and second sulfur oxidation zone or from a single oxidation reaction zone if only one is used. Both steam and superheated steam are readily produced from these heat exchange sections.

As well known, both the Claus tail gas process and the sulfur oxidation process typically produce tail gases requiring treatment prior to discharge to the atmosphere. Such clean up is not a part of the present invention but is useful in conjunction with the remaining steps of the present invention. An important feature of the present invention is the use of the sulfur oxidation step to produce heat for the generation of energy in the form of steam, electrical power or the like with the sulfur dioxide so produced being converted back to sulfur in the Claus process. The net result is that the process produces a substantial quantity of energy and optimizes the conversion of hydrogen sulfide to sulfur.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A method for producing sulfur and energy from an acid gas stream comprising hydrogen sulfide, the process comprising:
   a) charging the acid gas stream comprising hydrogen sulfide and an oxygen-containing gas to a combustion zone;
   b) combusting a quantity of the acid gas sufficient to produce a combustion flame temperature from about 1500 to about 2000° F. to produce a combustion product gas comprising hydrogen sulfide and sulfur dioxide;
   c) mixing a sulfur dioxide stream with the combustion product gas in an amount sufficient to produce a reaction gas having an $H_2S:SO_2$ ratio from about 1.9 to about 2.1;
   d) cooling the reaction gas to produce sulfur and heat energy;
   e) passing the reaction gas to a Claus process to produce sulfur;
   f) combusting sulfur with an oxygen-containing gas in at least one combustion chamber to produce a combustion product sulfur dioxide stream and heat energy; and,
   g) passing at least a portion of the combustion product sulfur dioxide stream to mixture with the combustion product gas.

2. The method of claim 1 wherein the reaction gas is cooled to a temperature from about 500 to about 600° F.

3. The method of claim 1 wherein sulfur is separated from the reaction gas at a temperature from about 250 to about 400° F.

4. The method of claim 1 wherein the sulfur dioxide stream mixed with the combustion product gas is at a temperature from about 600 to about 1000° F.

5. The method of claim 1 wherein the combustion product sulfur dioxide stream is separated from at least a portion of light gases and water present in the combustion product sulfur dioxide stream prior to mixing a portion of the combustion product sulfur dioxide stream with the combustion product gas stream.

6. The method of claim 1 wherein the oxygen-containing gas is oxygen, air or oxygen-enriched air.

7. The method of claim 1 wherein the sulfur is combusted in a single combustion chamber.

8. The method of claim 1 wherein the sulfur is combusted with a sub-stoichiometric amount of oxygen.

9. The method of claim 1 wherein sulfur is combusted by injecting the sulfur into the combustion chamber as a pre-heated liquid.

10. The method of claim 9 wherein the sulfur is injected at a pressure sufficient to permit condensation of the product sulfur dioxide.

11. The method of claim 10 wherein the pressure is from about atmospheric to about 1000 psi.

12. The method of claim 1 wherein the sulfur is combusted in at least two in series combustion chambers.

13. The method of claim 12 wherein the temperature in the first combustion chamber is limited by limiting the amount of oxygen-containing gas charged to the first combustion chamber.

14. The method of claim 13 wherein reaction products from the first combustion chamber are cooled and passed to a second combustion chamber.

15. The method of claim 14 wherein the reaction products are cooled to a temperature above the auto ignition temperature for the reaction products and an oxygen-containing gas.

16. The method of claim 1 wherein at least one of a Claus process tail gas and a stream of light gases recovered from the combustion product sulfur dioxide stream are processed to separate sulfur dioxide from the streams for recovery as sulfur dioxide.

17. The method of claim 16 wherein the recovered sulfur dioxide is passed to mixture with the combustion product gas.

* * * * *